US010372465B2

(12) United States Patent
Balkan et al.

(10) Patent No.: US 10,372,465 B2
(45) Date of Patent: Aug. 6, 2019

(54) SYSTEM AND METHOD FOR CONTROLLING BATCH JOBS WITH PLUGINS

(71) Applicant: ORACLE INTERNATIONAL CORPORATION, Redwood Shores, CA (US)

(72) Inventors: Colleen M. Balkan, Madison, CT (US); Andre J. Marais, Lake Zurich, IL (US); Brian P. Conlon, Grayslake, IL (US); Robert D. O'Connell, Jr., Budd Lake, NJ (US); John Glenn H. Santos, Pleasant Hill, CA (US); William C. Hedges, San Bruno, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 391 days.

(21) Appl. No.: 15/389,873

(22) Filed: Dec. 23, 2016

(65) Prior Publication Data

US 2018/0181415 A1   Jun. 28, 2018

(51) Int. Cl.
| G06F 9/46 | (2006.01) |
| G06F 9/48 | (2006.01) |
| G06F 3/048 | (2013.01) |
| G06F 9/445 | (2018.01) |
| G06F 16/245 | (2019.01) |
| G06F 16/2453 | (2019.01) |
| G06F 16/2455 | (2019.01) |
| G06F 9/455 | (2018.01) |

(52) U.S. Cl.
CPC .......... *G06F 9/44526* (2013.01); *G06F 3/048* (2013.01); *G06F 9/45512* (2013.01); *G06F 9/466* (2013.01); *G06F 9/4881* (2013.01); *G06F 16/245* (2019.01); *G06F 16/2453* (2019.01); *G06F 16/2455* (2019.01)

(58) Field of Classification Search
None
See application file for complete search history.

(56) References Cited

U.S. PATENT DOCUMENTS

| 6,370,521 B1 * | 4/2002 | Pigos, Jr. ............. G06Q 10/107 |
| 2003/0016798 A1 * | 1/2003 | Cashiola ............... H04M 15/00 |
| | | 379/115.01 |
| 2017/0372246 A1 * | 12/2017 | Storey ............. G06Q 10/06316 |

* cited by examiner

*Primary Examiner* — Qing Yuan Wu
(74) *Attorney, Agent, or Firm* — Kraguljac Law Group, LLC (57) ABSTRACT

Systems, methods, and other embodiments associated with controlling batch jobs with plugins are described. In one embodiment, a method includes querying a batch definition database to retrieve a record identification plugin including a first declarative statement defining parameters of the record identification plugin and a database query statement used by the record identification plugin to select records within a database. The example method may also include querying the batch definition database to retrieve a process records plugin including a second declarative statement defining how the process records plugin is to process the selected records. The example method may also include interpreting the first declarative statement to control execution of a batch process to select the records within the database. The example method may also include interpreting the second declarative statement to control execution of the batch process to process the records to create a batch job result.

20 Claims, 8 Drawing Sheets

SYSTEM AND METHOD FOR CONTROLLING BATCH JOBS WITH PLUGINS

BACKGROUND

Many users, such as businesses, are using computing services that are provided from a remote service provider, such as a services provided by a distributed network environment (e.g., a cloud service). In an example, a utility company accesses a cloud computing environment in order to consume services provided by the cloud computing environment. For example, the utility company uploads meter read data, customer data, billing data, and/or a variety of other data to the cloud computing environment. Such data is stored within databases or other storage structures of the cloud computing environment. The utility company may invoke various services of the cloud computing environment to perform operations upon the data. For example, a billing service, operating within the cloud computing environment, is used to extract selected data from a database such as customer information data, meter read data, and energy rate data. The billing service provides billing functionality that processes the extracted data and generates bills that are emailed to customers.

There are services and functionality of the cloud computing environment that are accessed in real-time, such as billing information obtained by a customer support representative while handling a client call. In order to reduce network bandwidth, processing and storage sources, and/or overall system load, it is desirable to perform certain functionality at off-peak times (e.g., during the night or weekend). Such functionality is performed by batch jobs that can perform specified tasks if the computing system supports batch processing. A batch job is a computer program configured for a specific task that is compiled and executed without manual intervention.

Unfortunately, typical cloud computing environments do not host or provide application programming development environments, such as a Java integrated development environment (IDE). Thus, users cannot create applications such as batch jobs capable of performing tasks within the cloud computing environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that provide for controlling batch jobs with plugins in a computing system. A user, such as a business, may want to implement custom logic to process data within a particular computing environment, such as a remote computing environment. One example environment may be a distributed computing network, such as a cloud computing network, that provides services to users such as cloud services for billing customers, tracking inventory, tracking equipment health, etc. Unfortunately, the remote computing environment may not provide development environments, such as a Java integrated development environment (IDE), through which the user could create custom programs. Thus, the user may be unable to implement custom logic within the remote computing environment. For example, the user may lack the tools to create Java code that is compiled into a Java program that can determine health statistics of industrial equipment utilizing equipment health data stored within the remote computing environment. Accordingly, the user may be unable to create/code programs for execution within the remote computing environment because the user does not have access to development tools within the remote computing environment to write, test, and deploy programs, such as batch jobs.

Accordingly, in one embodiment, a system is described that is configured to construct and execute batch jobs that are controlled with plugins. In particular, the plugins are declarative statements that do not need to be compiled, as opposed to programming code that needs to be compiled to be executed. The declarative statements of the plugin define how a batch job is to select and process data to perform some function without manual intervention. Declaratively defining the batch job and controlling execution of batch jobs with declarative plugins reduces processing and storage resources of a computing system that would otherwise be used to compile programming code into a batch job and execute the batch job.

For example, a batch job definition interface is provided to a user. The batch job definition interface may be accessible through the remote computing environment, and displayed on a computing device of the user. The user can utilize the batch job definition interface to declaratively define a record identification plugin and a database query statement used to retrieve records within a database maintained by the remote computing environment. For example, the database query statement may be used to retrieve customer billing data from the database.

Figure 1:
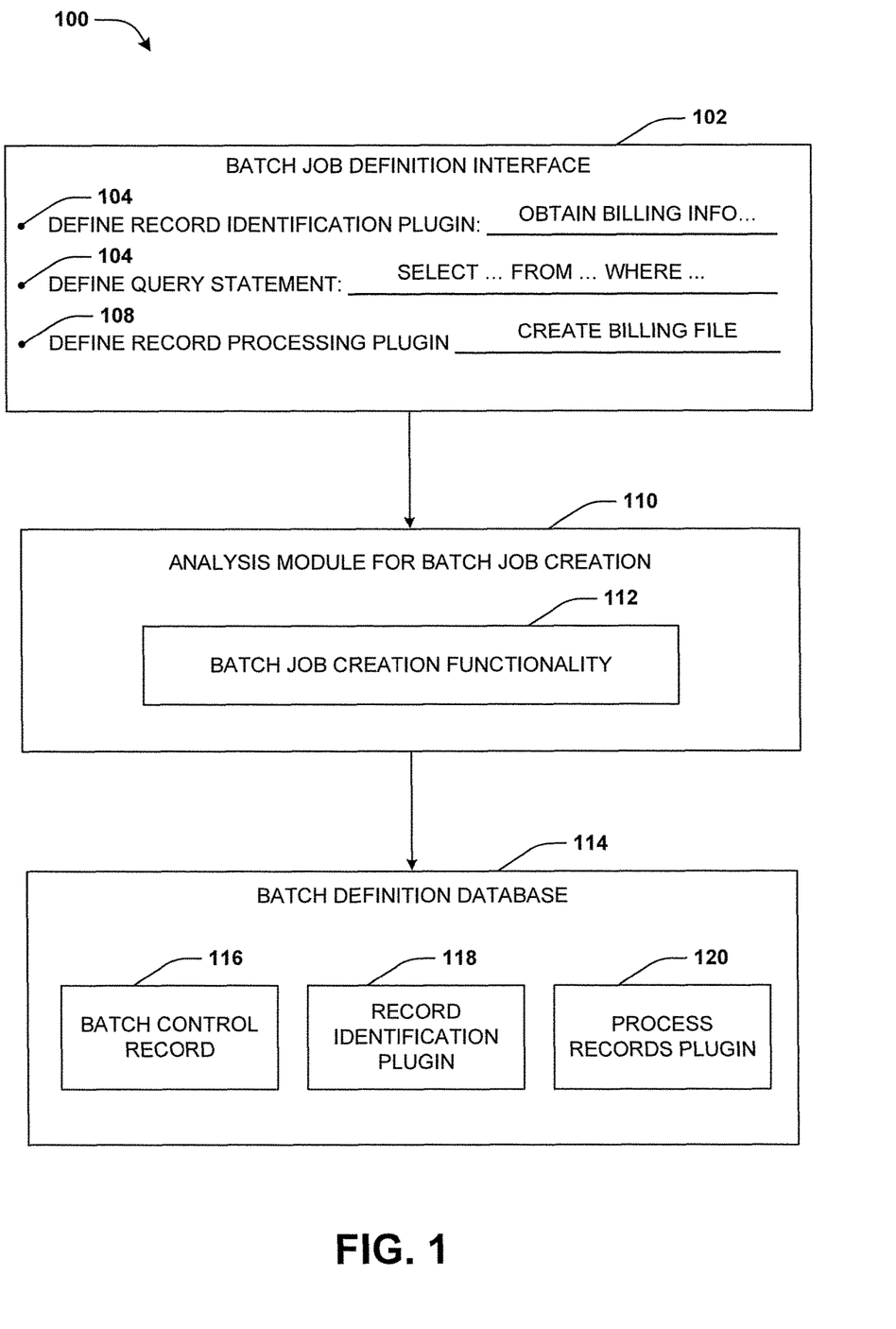
FIG. 1 illustrates an embodiment of a system associated with controlling batch jobs with plugins, where a record identification plugin and a process records plugin are created.

With reference to FIG. 1, one embodiment of a system 100 associated with controlling batch jobs with plugins is illustrated. The system 100 includes an analysis module 110 for batch job creation, which can be configured to execute on a computer, such as computer 806 of FIG. 8. For example, an analysis module 813, of FIG. 8, includes the analysis module 110. The analysis module 110 is initiated based upon a command received from a user to create a batch job for execution within a computing environment, such as a remote computing environment, such as a distributed network environment, a cloud computing environment, etc.

The user can utilize the batch job definition interface to declaratively define a process records plugin used to process the records selected by the record identification plugin using the data query statement. For example, one type of process records plugin may be defined and used to generate a bill from selected customer billing data. In one embodiment, the defined plugins are stored within a batch definition database as a library of plugins that are selectable for controlling batch jobs. In this way, the user can declaratively define the plugins by writing declarative statements/definitions as opposed to programming code.

A batch job is defined based upon the record identification plugin, the data query statement, and the process records plugin in a declarative manner without the need for an application programming environment, such as a Java IDE. Declaratively defining the batch job reduces development time because the user does not have to develop programming code from scratch, compile the code, test the code, etc. but can merely use declarative definitions and predefined functionality provided through the job definition interface. Declaratively defining the batch job reduces the need for programming code development expertise because creating declarative statements does not require such knowledge. Declaratively defining the batch job and controlling execution of the batch job with declarative plugins reduces processing and storage resources of a computing system that would otherwise be used to compile programming code into a batch job and execute the batch job.

A batch process for the batch job can be efficiently executed by querying the batch definition database to retrieve the record identification plugin. The record identification plugin includes a first declarative statement/definition defining parameters of the record identification plugin and includes the database query statement used by the record identification plugin to select records within the database. In one embodiment, the batch process is an instance of executable code that performs functionality defined by the batch job. The batch process retrieves plugins that control how the batch process implements the batch job. In this way, the batch job defines what functionality is to be performed, and the batch process is executed to perform that functionality based upon the plugins. In this way, the plugins control execution of the batch process, and thus control or define how the batch job is implemented by the batch process.

In one embodiment to control execution of a batch job, the batch definition database is queried to retrieve the process records plugin. The process records plugin includes a second declarative statement/definition defining how the process records plugin is to process records selected by the record identification plugin. The second declarative definition defines custom logic and/or reference predefined functionality provided by a billing service of the remote computing environment such as billing statement creation functionality for creating bills for customer. The batch process is executed to perform the batch job without compiling programming code because the plugins are not defined through programming code.

The first declarative definition and the second declarative definition are interpreted to select records from the database, and process the records to generate and output a batch job result. For example, customer billing data of a customer may be selected and evaluated to generate a billing document (batch job result) for the customer. The declarative definitions are interpreted into a script, as opposed to being complied into complied code, which is an improvement to computing systems that do not provide features to compile batch code.

In one embodiment, execution of the batch process to perform the batch job can be deferred to a time where resource utilization is lower than normal. For example, a computing system of a business may utilize a substantial amount of resources during daytime operation in order to access and interact with the remote computing environment. For example, resources may be used to access stored customer data, create customer repair work order, etc. Accordingly, execution of the batch process can be scheduled outside normal daytime operation, such as during the night, so that consumption of network bandwidth, processing and storage resources, and/or other resources does not interfere with resource usage during daytime operation. Without the ability to write custom batch jobs for automated execution in the remote computing environment at a later time, the business would have to waste substantial amounts of time and resources manually implementing individual real-time logic commands.

In one embodiment, the analysis module 110 generates and provides on a display screen a batch job definition interface 102 to the user. For example, the analysis module 110 utilizes a processor 808, memory 814, input/output (I/O) controllers 812, I/O interfaces 816, and/or I/O ports 818 accessible over a bus 810 of the computer 806 to generate and provide the batch job definition interface 102 to the user. In an example where the analysis module 110 is hosted on the computer 806 such as a client device that is external to the remote computing environment, the batch job definition interface 102 is rendered on a screen associated with the computer 806. In another example where the analysis module 110 is not hosted on the client device, the batch job definition interface 102 is rendered on a client device separate from the computer 806. For example, the computer 806 sends information over a network to the client device for rendering the batch job definition interface 102 on a screen associated with the client device.

In an example of batch job creation, the user defines a plugin type referring to where an executable resides. For example, the plugin type includes an algorithm type for validating a telephone format. The user defines a plugin that is an instance of the plugin type, where the plugin includes values for parameters of the plugin type. For example, the plug includes an algorithm of the algorithm type, where a validation parameter is set to accept or not accept dashes and/or parenthesis for a valid telephone format. The plugin type refers to a script that includes selection and processing functionality that the plugin type will invoke during execution of a batch job. The plugin will fill in values for parameters used by the script.

In another example of batch job creation, the analysis module 110 includes batch job creation functionality 112, such as executable code, an algorithm, etc. that executes using the processor 808, the memory 814, etc. The batch job creation functionality 112 populates the batch job definition interface 102 with a first interface 104 including functionality used to receive a first declarative definition defining parameters for a record identification plugin 118. For example, the parameters are used to define what billing information to extract from a database 314 of FIG. 3 and how to extract such data. The first interface 104 includes functionality used to receive a database query statement used by the record identification plugin 118 to select records within the database 314. For example, the database query statement includes a structured query language (SQL) statement used to select billing information and/or other information from the database 314. The batch job creation functionality 112 populates the batch job definition interface 102 with a second interface 108 used to receive a second declarative definition defining how a process records plugin 120 is to process records selected by the record identification plugin 118.

In this way, the batch job creation functionality 112 of the analysis module 110 receives the first declarative definition, the database query statement, and the second declarative definition through the batch job definition interface 102. The batch job creation functionality 112 constructs the record identification plugin 118 based upon the first declarative definition and the database query statement. For example, input of the first declarative definition and the database query statement are formatted and/or combined with any references to predefined functionality that will be used by the record identification plugin 118 for storage within a record of a batch definition database 114.

The batch job creation functionality 112 constructs the process records plugin 120 based upon the second declarative definition. For example, input of the second declarative definition are formatted and/or combined with any references to predefined functionality that will be used by the process records plugin 120 for storage within a record of the batch definition database 114. The record identification plugin 118 and the process records plugin 120 are stored within the batch definition database 114, such as locally stored within the computer 806 or remotely stored on another computer or storage device.

The batch job is constructed to reference the record identification plugin 118 and the process records plugin 120. For example, a template record, associated with batch execution program code that is executable by a batch process running the batch job, is provided through the batch job definition interface 102. For example, the batch process includes an executable program that executes the batch execution program code, which references and utilizes the record identification plugin 118 and the process records plugin 120 within the batch definition database 114 during execution. Responsive to receiving a copy command for the template record, the template record is duplicated to create a batch control record 116 referencing the batch execution program code.

Figure 3:
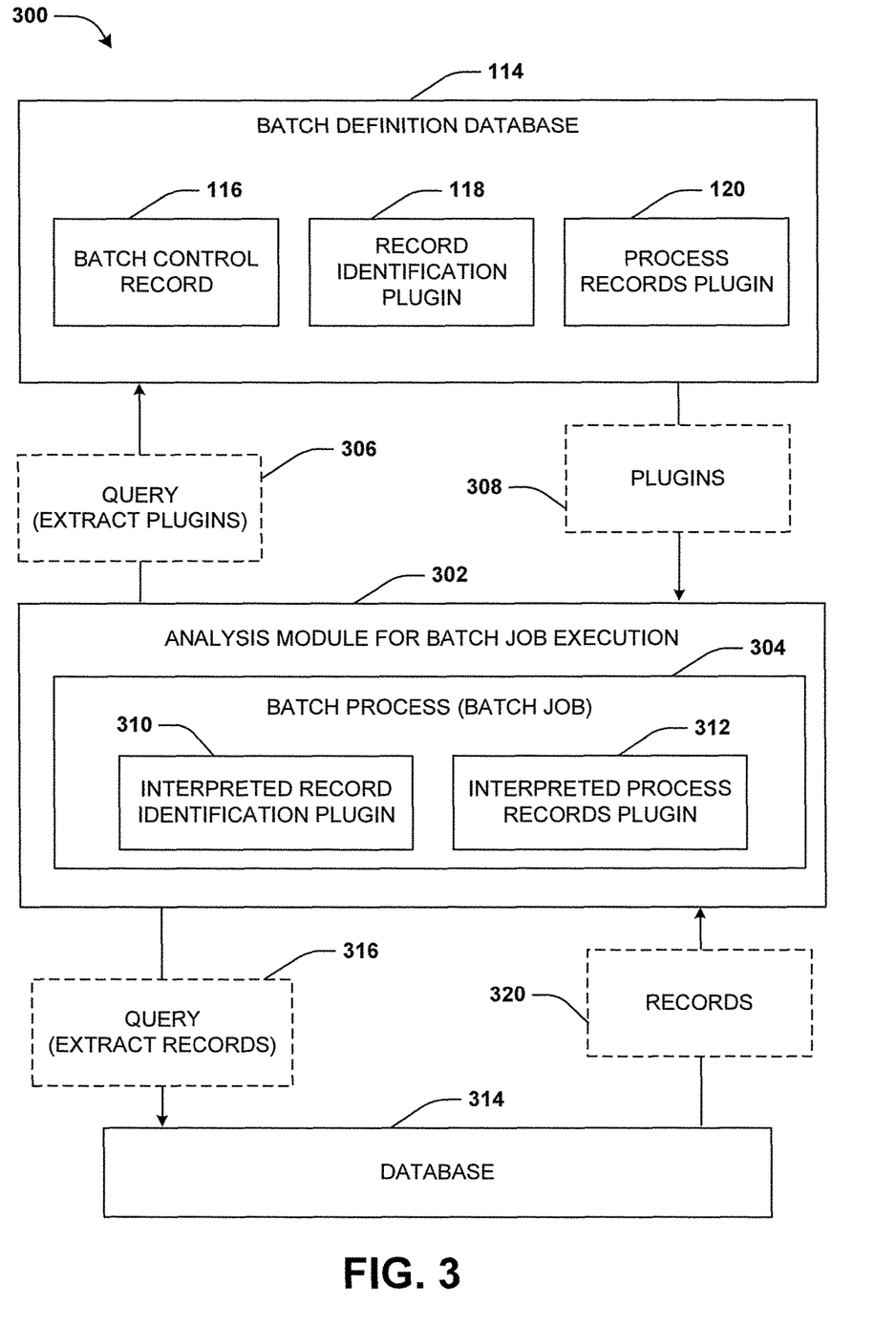
FIG. 3 illustrates an embodiment of a system associated with controlling batch jobs with plugins, where a batch process executes a batch job.

The batch control record 116 is configured to reference the record identification plugin 118 and/or the process records plugin 120 so that during execution of the batch process, the batch execution program code can identify and utilize the record identification plugin 118 and the process records plugin 120. The batch control record 116 is stored within the batch definition database 114. In an example, the batch execution program code is a program that will invoke/interpret the record identification plugin 118 and/or the process records plugin 120 during execution of the batch process, which is stored within the batch definition database 114 as the batch job. The batch execution program code includes a Java program executable by the remote computing network. The batch job is stored as the batch control record 116, the record identification plugin 118, and/or the process records plugin 120. The batch control record 116 is a record within a database table that defines the batch job, and references the record identification plugin 118 and/or the process records plugin 120 of what to select and how to process the selected data from the database 314.

In an example, the batch job definition interface 102 is populated with a variety of other information, predefined functionality that can be associated with the batch job. The predefined functionality includes predefined error handling, batch job restart functionality, and/or other functionality provided by services of the remote computing environment within which the batch job will be run. For example, field and value pairs of records that are to be selected by the database query statement is displayed through the batch job definition interface 102 so that the user can visualize what information will be retrieved during execution of the batch job. Once the batch job has been constructed, the batch job is scheduled for execution such as through the batch process 304 of FIG. 3.

Figure 2:
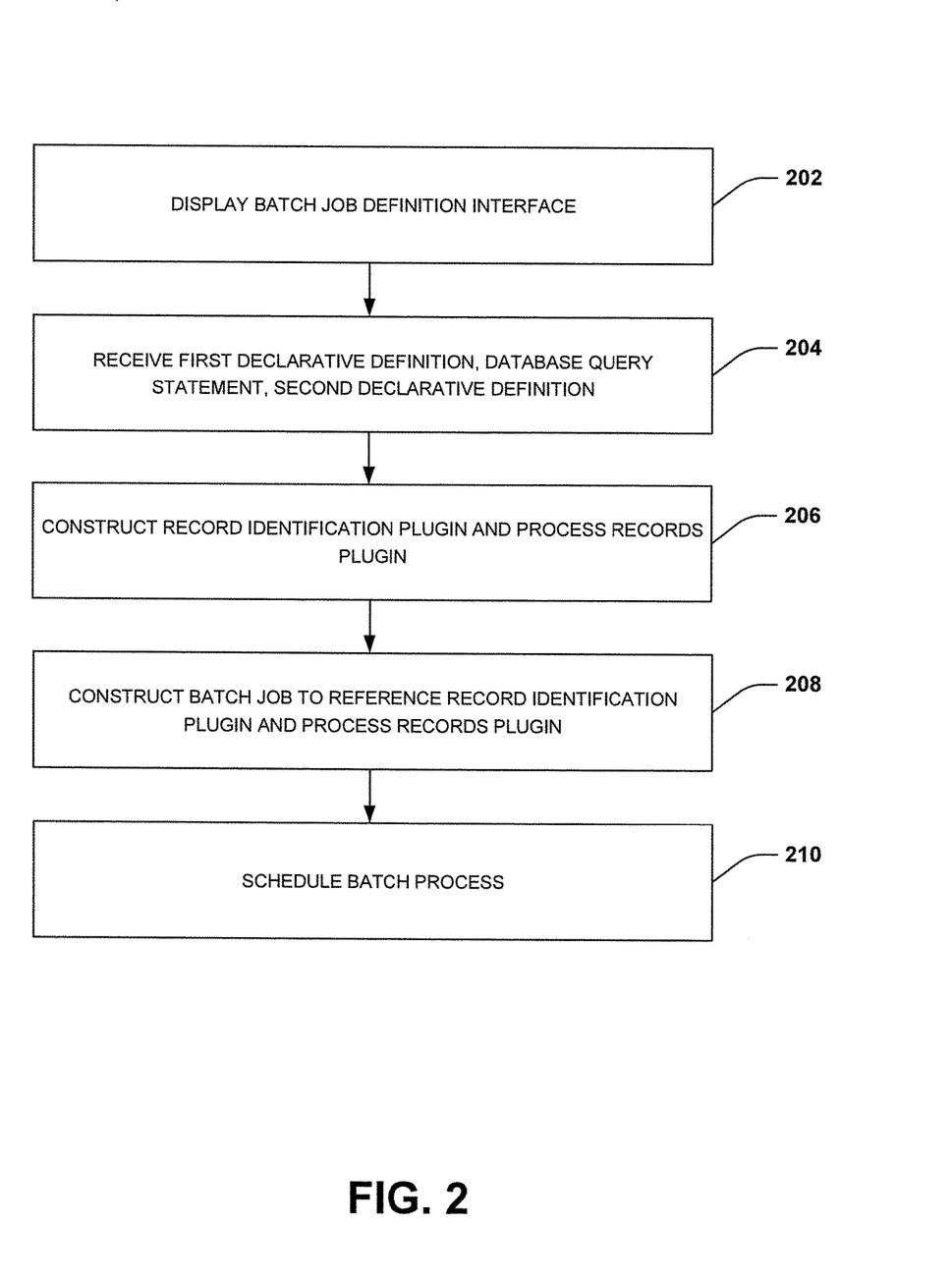
FIG. 2 illustrates one embodiment of a method associated with controlling batch jobs with plugins, where a record identification plugin and a process records plugin are created.

With reference to FIG. 2, one embodiment of a computer implemented method 200 associated with controlling batch jobs with plugins is illustrated. In one embodiment, the method 200 is performed by the analysis module 110 utilizing various computing resources of the computer 806, such as the processor 808 for executing instructions within the batch job creation functionality 112, memory 814 and/or disks 824 for storing the instructions of the batch job creation functionality 112 and/or the batch definition database 114, and/or network hardware for communicating information between the computer 806 and a client device over a network. The method 200 can be triggered based upon various triggers, such as receipt of a request to construct a batch job. For example, a user of a client device may log into a cloud service in order to create a batch job for accessing and processing client data stored within a cloud computing environment of the cloud service.

At 202, the batch job definition interface 102 is generated and displayed on a display screen. The batch job definition interface 102 is populated with the first interface 104 that has functionality used to receive a first declarative definition, defining parameter of the record identification plugin 118, and the database query statement used by the record identification plugin 118 to select records within the database 314. For example, the user may desire to create a batch job that can be used to identify credit cards whose expiration dates have expired within the last 30 days, and to send notifications to customers to update the expiration dates. Accordingly, the user can input, through the first interface 104, the first declarative definition. The first declarative definition defines parameters regarding how and what information is to be selected from the database 314. The user can also input, through the first interface 104, the database query statement such as a SQL select statement used to query the database 314 to retrieve credit card information and customer contact information.

The batch job definition interface 102 is populated with the second interface 108 that has functionality used to receive a second declarative definition defining how the process records plugin 120 is to process records 320 selected by the record identification plugin 118. For example, the second declarative definition includes declarative statements that define how the credit card information and the customer contact information is to be processed in order to send notifications to customers to update the expiration dates. In an example, the second declarative definition does not include programming code, but includes declarative definitions, script, etc. In this way, the first declarative definition, the second declarative definition, and the data query statement are received, at 204, such as by the analysis module 110 that is included within the analysis module 813 of the computer 806.

At 206, the record identification plugin 118 is constructed based upon the first declarative definition and the database query statement, and the process records plugin 120 is constructed based upon the second declarative definition. For example, the plugins are constructed as data structures by applying values within the declarative definitions to parameters of plugin type templates for selecting and processing data. The record identification plugin 118 and the process records plugin 120 are stored within the batch definition database 114, such as within records of a database table.

At 208, the batch job, referencing the record identification plugin 118 and the process records plugin 120, is constructed and/or stored as the batch control record 116 within the batch definition database 114. For example, batch control record 116 corresponds to an executable that will retrieve and interpret the record identification plugin 118 and the process records plugin 120 for execution of the batch job. At 210, a batch process (e.g., the batch process 304), used to execute the batch job, is scheduled for execution.

With reference to FIG. 3, one embodiment of a system 300 associated with controlling batch jobs with plugins is illustrated. The system 300 includes an analysis module 302 for batch job execution, which is configured to execute on a computer, such as computer 806 of FIG. 8. For example, analysis module 813, of FIG. 8, includes the analysis module 302. The analysis module 302 is initiated based upon an indication that a batch job is to be executed. For example, the indication corresponds to a generated instructions from a timer expiring, a scheduler sending a scheduler command that the batch job is to be executed, a user submitted command indicating that the batch job is to be executed, etc.

The analysis module 302 includes instructions used to control execution of the batch process 304. The batch process 304 is used to run the batch job based upon the batch control record 116, the record identification plugin 118, and/or the process records plugin 120 within the batch definition database 114. For example, the analysis module 302 queries 306 the batch definition database 114 to retrieve the batch control record 116 that refers to batch execution program code. The batch execution program code includes a program that is configured to interpret and utilize the record identification plugin 118 and/or the process records plugin 120 during runtime execution of the batch process 304. In one embodiment, the program is a Java program.

The batch control record 116 defines the batch job and identifies what data to select for controlling the batch job and how to process the selected data. For example, the batch control record 116 identifies the record identification plugin 118 and/or the process records plugin 120 associated with the batch job. Accordingly, the analysis module 302 queries 306 the batch definition database 114 to retrieve the record identification plugin 118 and/or the process records plugin 120 as plugins 308. In an example, the plugins 308, retrieved by the analysis module 302 from the batch definition database 114, is extracted in a text format or any other data format.

In one embodiment, the batch process 304 is executed in a multi-threaded manner in order to improve processing. Threads are assigned to sets of records for parallel processing. For example, the batch definition database 114 is queried to identify strategy instructions for the batch job. In an example, the strategy instructions include a thread level select strategy that specifies that the record identification plugin 118 is to select, but not load into memory, records 320 from the database 314. The record identification plugin 118 returns an identifier of the records for processing by one or more threads of the process records plugin 120. For example, the record identification plugin 118 returns a range of data within the database 314, which can be easily divided into groups of records for thread assignment. The thread level select strategy is used when there is a large amount of data that is numerically divisible for splitting and assigning to threads, which substantially reduces usage of the memory because the records 320 are not loaded into the memory. For example, the thread level select strategy is beneficial when retrieving records of account numbers or other numeric data that is easily identifiable and divisible.

In another example, the strategy instructions include a job level select strategy that specifies that the record identification plugin 118 is to select and load records 320 from the database 314 into memory. In this way, the records 320 are assigned from the memory to the one or more threads of the process records plugin 120. Thread assignment of records of non-numeric data may be easier when the records 320 are within memory. For example, the job level select strategy is used when the records 320 pertain to data that is not easily divisible, such as non-numeric data that is not easily identifiable and divisible within the batch definition database 114. In this way, execution of the batch process 304 is controlled based upon the strategy instructions, such as whether the batch process 304 uses the record identification plugin 118 to load the records 320 into memory for assignment to threads or merely selects the records 320 for assignment to threads.

Figure 5:
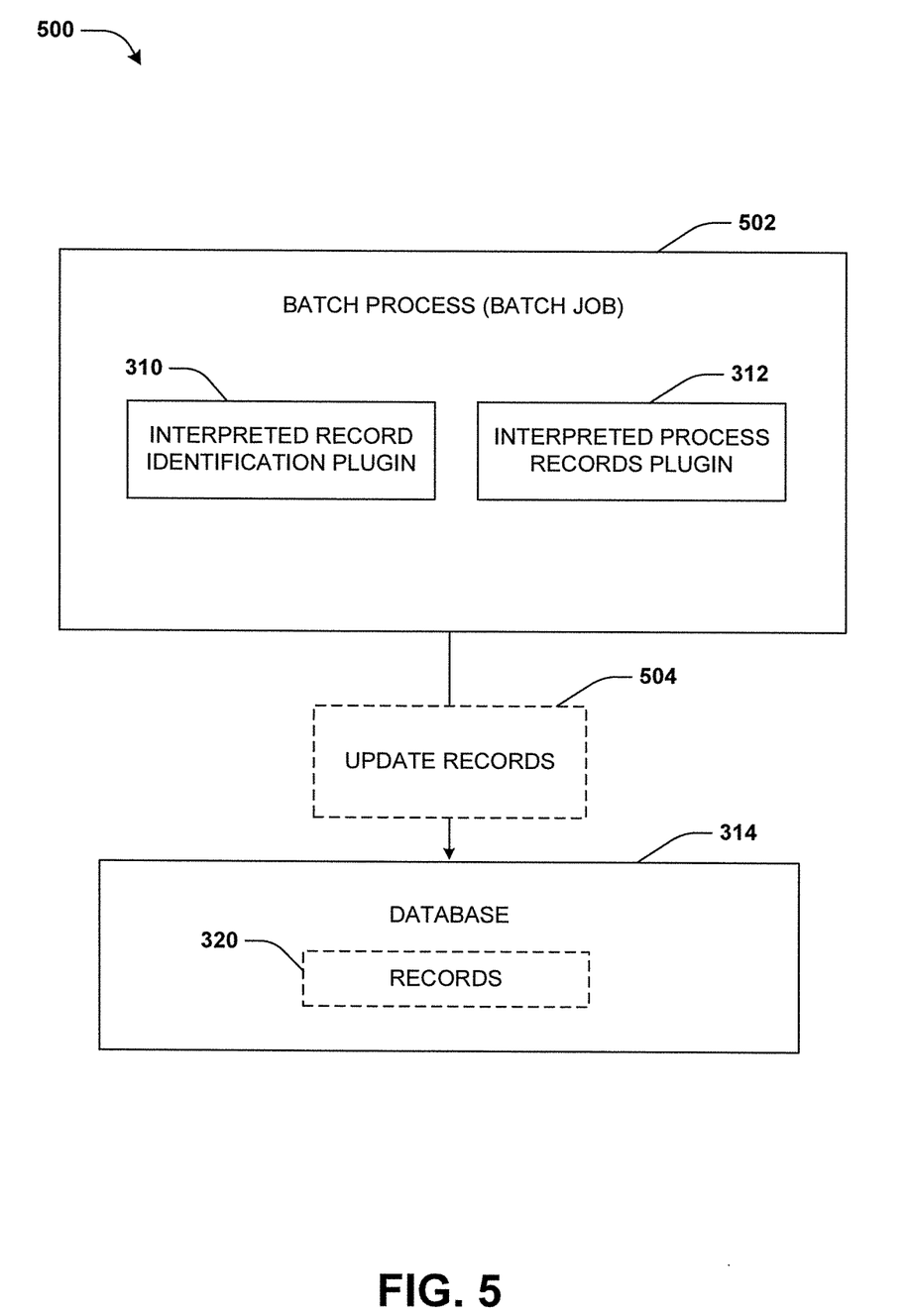
FIG. 5 illustrates an embodiment of a system associated with controlling batch jobs with plugins, where a batch job updates records within a database.

Various job types of batch jobs are executed to perform various types of functionality. For example, the batch definition database 114 is queried to identify a job type of the batch job. In an example, the job type is an ad-hoc job type used to implement logic, of the process records plugin 120, upon the records 320 selected by the record identification plug 118. For example, the batch job, having the ad-hoc job type, processes the records 320 and update 504 one or more records within the database 314, as illustrated in FIG. 5.

Figure 6:
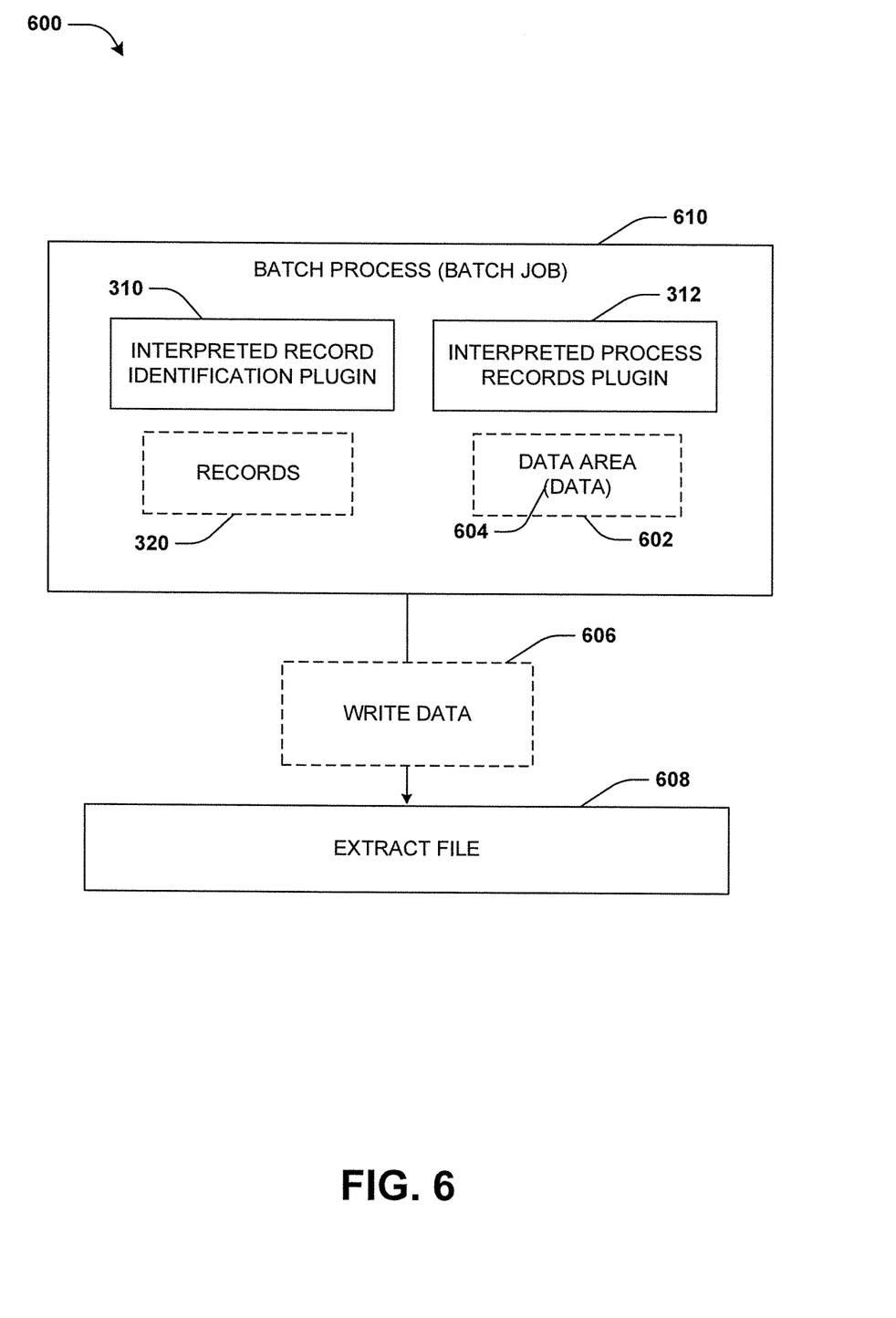
FIG. 6 illustrates an embodiment of a system associated with controlling batch jobs with plugins, where a batch job writes data to an extracted file.

In another example, the job type is an extract job type used to extract data 604 from the records 320 selected by the record identification plugin 118 and store the data 604 within an extract file 608 of FIG. 6. The data 604 is extracted into a data area 602. That is, the data 604 is stored into the data area 602 by the record identification plugin 118 for further processing by the process records plugin 120 or stored into the data area 602 by the process records plugin 120 after processing the data 604. A file path, a file name, and/or a data format for the extract file 608 are specified by the job type. In this way, the data 604 is written 606 into the extract file 608 according to the data format, such as a text format, a comma delimited format, a fixed position format, extensible markup language (XML), etc. The extract file 608 is stored using the file path and the file name. In this way, the record identification plugin 118 and/or the process records plugin 120 do not need to understand how to write the data 604 to the extract file 608 (e.g., what file path to use, what file name to use, etc.) because such processing is performed by the batch process 610.

During execution of the batch process 304, the record identification plugin 118 and/or the process records plugin 120 are extracted from the batch definition database 114 as the plugins 308. The plugins 308 are interpreted to create an interpreted record identification plugin 310 and an interpreted process records plugin 312. For example, the first declarative statement of the record identification plugin 118 is extracted as text and interpreted as the interpreted record identification plugin 310, such as a script. The script is used to control execution of the batch process 304 to select the records 320 within the database 314 using the database query statement as a query 316. The second declarative statement is extracted as text and interpreted as the interpreted process records plugin 312, such as a second script. The second script is used to control execution of the batch process 304 to process the records 320 to generate and output a batch job result.

In an example, the first declarative statement and the second declarative statement is interpreted into script that is executed by the batch execution program code of the batch process 304. In this way, execution of the batch process 304 (e.g., execution of the script) is performed through non-compiling declarative statement interpretation that interprets declarative statements for execution and does not compile programming code. For example, the record identification plugin 118 and the process records plugin 120 are not program code that needs to be compiled but are instead textual declarative statements that are interpreted and executed without compiling.

During execution of a thread of the batch process 304, a current work unit is evaluated to determine whether the current work unit is a first work unit for the thread or a last work unit for the thread. Responsive to the current work unit being the first work unit for the thread, a first parameter is set to a first value indicative of the current work unit being the first work unit. Responsive to the current work unit being the last work unit for the thread, a second parameter (e.g., or the first parameter) is set to a second value indicative of the current work unit being the last work unit. In this way, the thread is able to determine whether more work is to be performed and/or whether there is an opportunity to perform additional work because execution of the thread is complete.

In one embodiment, the database query statement, the interpreted record identification plugin 310, and/or the interpreted process records plugin 312 includes a dynamic component. For example, the database query statement includes a query to find all credit cards that have expired within a dynamic time span such as a last 30 days. Accordingly, a dynamically selected value is provided to the dynamic component during execution of the batch process 304. For example, the batch process 304 determines a particular date that is 30 days prior to a current date, and provides that particular date to the database query statement for querying the database 314.

During execution of the batch process 304, error handling is provided. For example, responsive to identifying an error with the execution of the batch process 304, error handling is performed to address the error. The error is addressed by creating a record of the error within a file or database, providing a notification of the error to the user, etc. In an example, the batch process 304 is restarted (e.g., automatically restarted) after performance of the error handling.

In another example, a batch job tracking interface is displayed. The batch job tracking interface is populated with execution progress of the batch process 304. For example, the batch job tracking interface is populated with a batch job identifier of the batch job. The batch job tracking interface is populated with a tree or other structure that is populated with thread information for threads of the batch process 304. The batch job tracking interface is populated with thread-run instance information of the threads of the batch process 304. The batch job tracking interface is populated with warning and/or error information of abnormal execution of the batch process 304 (e.g., a warning that no records were selected from the database 314).

In an example, the batch process 304 is executed based upon the record identification plugin 118 and not the process records plugin 120. For example, the record identification plugin 118 is retrieved from the batch definition database 114. The record identification plugin 118 is interpreted into the interpreted record identification plugin 310 for use by the batch process 304 during execution, such as to retrieve the records 320 from the database 314. In this way, merely a single plugin or less than all available plugins are used. For example, this may be useful when a utility company wants to allow a customer to select a credit card to use from the database 314, but not allow the customer to process the credit card. In this way, the utility company can control how the credit card is processed with a bank.

In an example, the record identification plugin 118 and/or the process records plugin 120 are easily updated by making modifications to the records of the batch definition database 114 within which the record identification plugin 118 and the process records plugin 120 are stored. The plugins are easily updated because the record identification plugin 118 and/or the process records plugin 120 are declarative definitions/statements there is no need to change programming code and/or recompile programming code. For example, responsive to receiving a parameter change request (e.g., credit card information is now to be sent to a new bank by the process records plugin 120), the batch definition database 114 is updated based upon the parameter change request.

Figure 4:
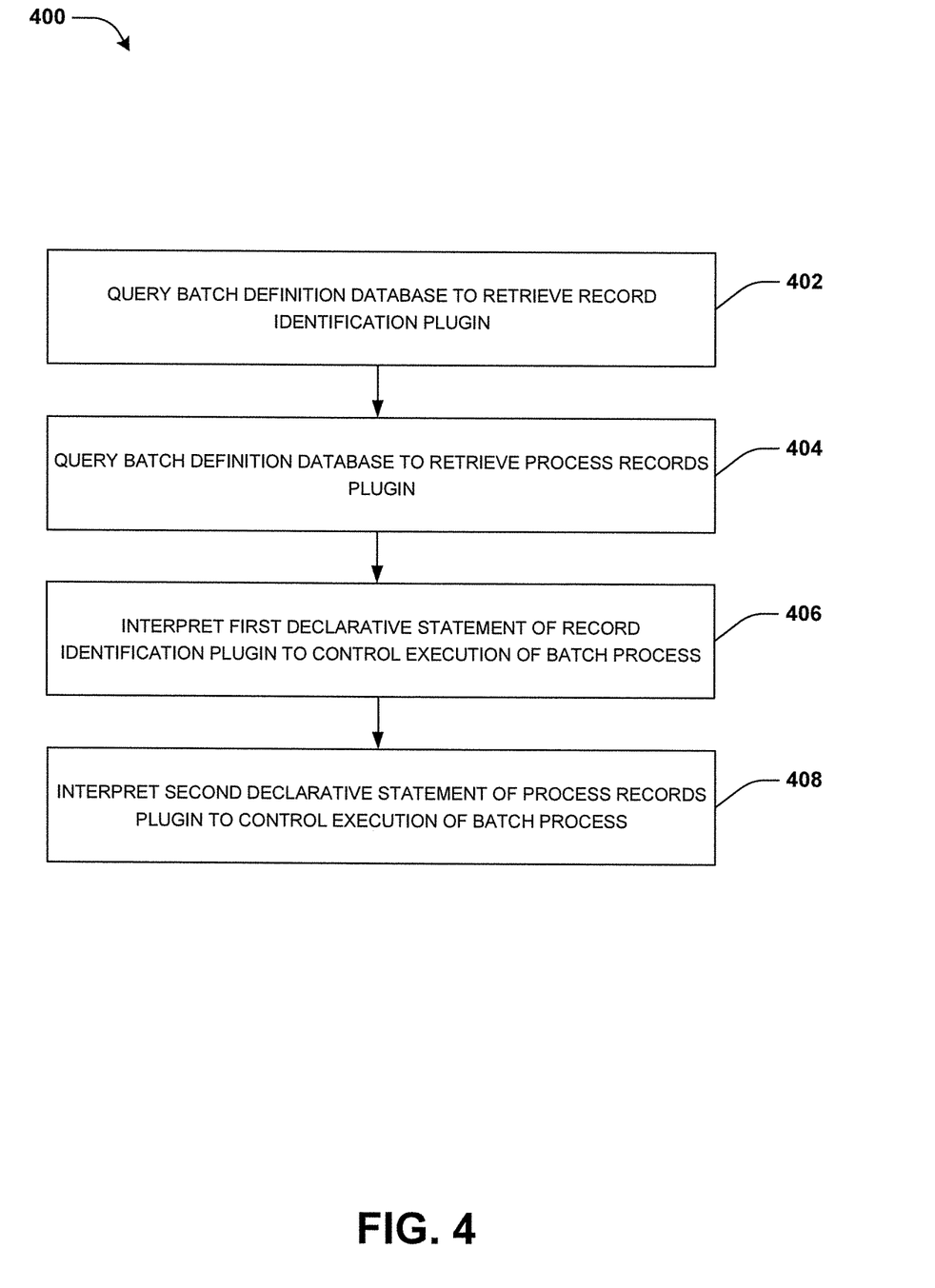
FIG. 4 illustrates one embodiment of a method associated with controlling batch jobs with plugins, where a batch process executes a batch job.

With reference to FIG. 4, one embodiment of a computer-implemented method 400 associated with controlling batch jobs with plugins is illustrated. The method 400 is performed by the analysis module 302 utilizing various computing resources of the computer 806. For example, the processor 808 is utilized for executing instructions within the batch job creation functionality 112. Memory 814 and/or disks 824 are utilized for storing the instructions of the batch process 304 and/or storing the batch definition database 114. Network hardware is utilized for communicating information between the computer 806 and a client device over a network. The method 400 is triggered based upon an indication that a batch job is to be executed. The indication includes a generated instruction associated with a timer expiring, a scheduler sending a scheduler command that the batch job is to be executed, a user submitted command indicating that the batch job is to be executed, a request to execute a batch job, etc.

At 402, in response to receiving an instruction to execute a batch job, the batch definition database 114 is queried 306 to retrieve the record identification plugin 118 including a first declarative statement defining parameters of the record identification plugin 118 and the database query statement used by the record identification plugin to select records 320 within the database 314. In an example, the instruction includes a batch job identifier of the batch job. The batch definition database 114 is queried using the batch job identifier to identify the batch control record 116. The batch control record 116 includes references, such as identifiers, to the record identification plugin 118 and the process records plugin 120. Accordingly, the references are used to query the batch definition database 114 to retrieve the record identification plugin 118 and the process records plugin 120. In an example, the database query statement is used to select industrial equipment operational status information.

At 404, the batch definition database 114 is queried 306 to retrieve the process records plugin 120 including the second declarative statement defining how the process records plugin 120 is to process the records 320 selected by the record identification plugin 118. For example, the industrial equipment operational status information is to be evaluated to identify industrial equipment that is operating in a degrade state.

At 406, the system using at least the processor, interprets the first declarative statement of the record identification plugin 118 to control execution of the batch process 304 to select the records 320 within the database 314 using the database query statement. For example, the first declarative statement is interpreted into script, such as the interpreted record identification plugin 310, which can be run by batch execution program code of the batch process 304.

At 408, the system using at least the processor, interprets the second declarative statement of the process records plugin 120 to control execution of the batch process 304 to process the records 320 to create a batch job result. The batch process 304 controls the execution of the batch job, which generates and outputs the batch job result. For example, the second declarative statement is interpreted into script, such as the interpreted process records plugin 312, which can be run by batch execution program code of the batch process 304.

With reference to FIG. 5, one embodiment of a system 500 associated with controlling batch jobs with plugins is illustrated. The system 500 utilizes the analysis module 302 for batch job execution of a batch process 502 for a batch job having an ad-hoc job type. In particular, the interpreted record identification plugin 310 (e.g., interpreted script from the first declarative definition/statement) is run by batch execution program code of the batch process 502. The interpreted record identification plugin 310 is run to select the records 320 within the database 314, such as to select meter reading data). The interpreted process records plugin 312 (e.g., interpreted script from the second declarative definition/statement) is run by the batch execution program code to update 504 the records 320 selected within the database 314. For example, the interpreted process records plugin 312 is run to upload new meter reading data to the database 314.

With reference to FIG. 6, one embodiment of a system 600 associated with controlling batch jobs with plugins is illustrated. The system 600 utilizes the analysis module 302 for batch job execution of a batch process 610 for a batch job having an extract job type. In particular, the interpreted record identification plugin 310 (e.g., interpreted script from the first declarative definition/statement) is run by batch execution program code of the batch process 610. The interpreted record identification plugin 310 is run to select the records 320 within the database 314, such as to select meter reading data. The interpreted process records plugin 312 (e.g., interpreted script from the second declarative definition/statement) is run by the batch execution program code to write data 604 into data area 602. For example, the interpreted process records plugin 312 is run to write customer billing data into the data area 602 based upon implementing logic upon the meter reading data.

The batch process 610 determines a file name, a file path, a data format, and/or other information for the extract file 608 into which the data 604 is to be written 606. For example, the extract file 608 may correspond to a customer bill. The batch process 610 writes 606 the data 604 from the data area 602 into the extract file 608 according to the data format. For example, the data format includes a comma delimited format, an XML format, etc. The batch process 610 applies the file name and the file path to the extract file 608. For example, the extract file 608 is stored, with the file name, in a storage location referenced by the file path. In this way, the interpreted process records plugin 312 does not need to understand the particulars of writing 606 the data 604 to the extract file 608, but merely processes the records 320 and stores the data 604 resulting from the processing into the data area 602.

Figure 7:
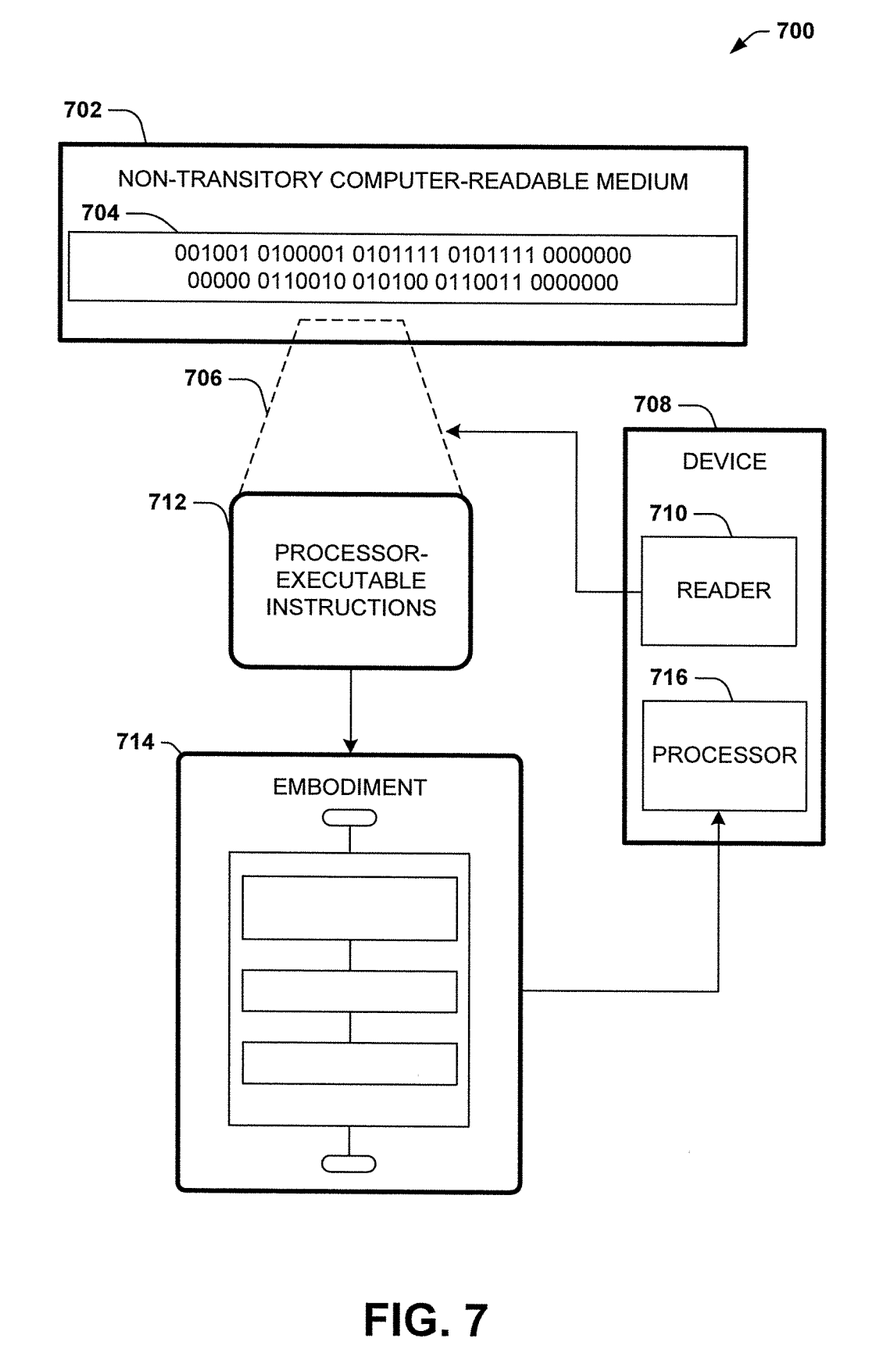
FIG. 7 illustrates an embodiment of a non-transitory computer-readable medium.

FIG. 7 is an illustration of a scenario 700 involving an example non-transitory computer-readable medium 702. In one embodiment, one or more of the components described herein are configured as program modules, such as the analysis module 106, stored in the non-transitory computer-readable medium 702. The program modules are configured with stored instructions, such as processor-executable instructions 712, that when executed by at least a processor, such as processor 716, cause the computing device to perform the corresponding function(s) as described herein. For example, functionality of the analysis module 106, stored in the non-transitory computer-readable medium 702, may be executed by the processor 716 as the processor-executable instructions 712 to perform an embodiment 714 of the method 200 of FIG. 2.

The non-transitory computer-readable medium 702 includes the processor-executable instructions 712 that when executed by a processor 716 cause performance of at least some of the provisions herein. The non-transitory computer-readable medium 702 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712.

In some embodiments, the processor-executable instructions 712, when executed cause performance of operations, such as at least some of the example method 200 of FIG. 2 and/or at least some of the example method 400 of FIG. 4, for example. In some embodiments, the processor-executable instructions 712 are configured to cause implementation of a system, such as at least some of the example system 100 of FIG. 1, at least some of the example system 300 of FIG. 3, at least some of the example system 500 of FIG. 5, and/or at least some of the example system 600 of FIG. 6, for example.

Figure 8:
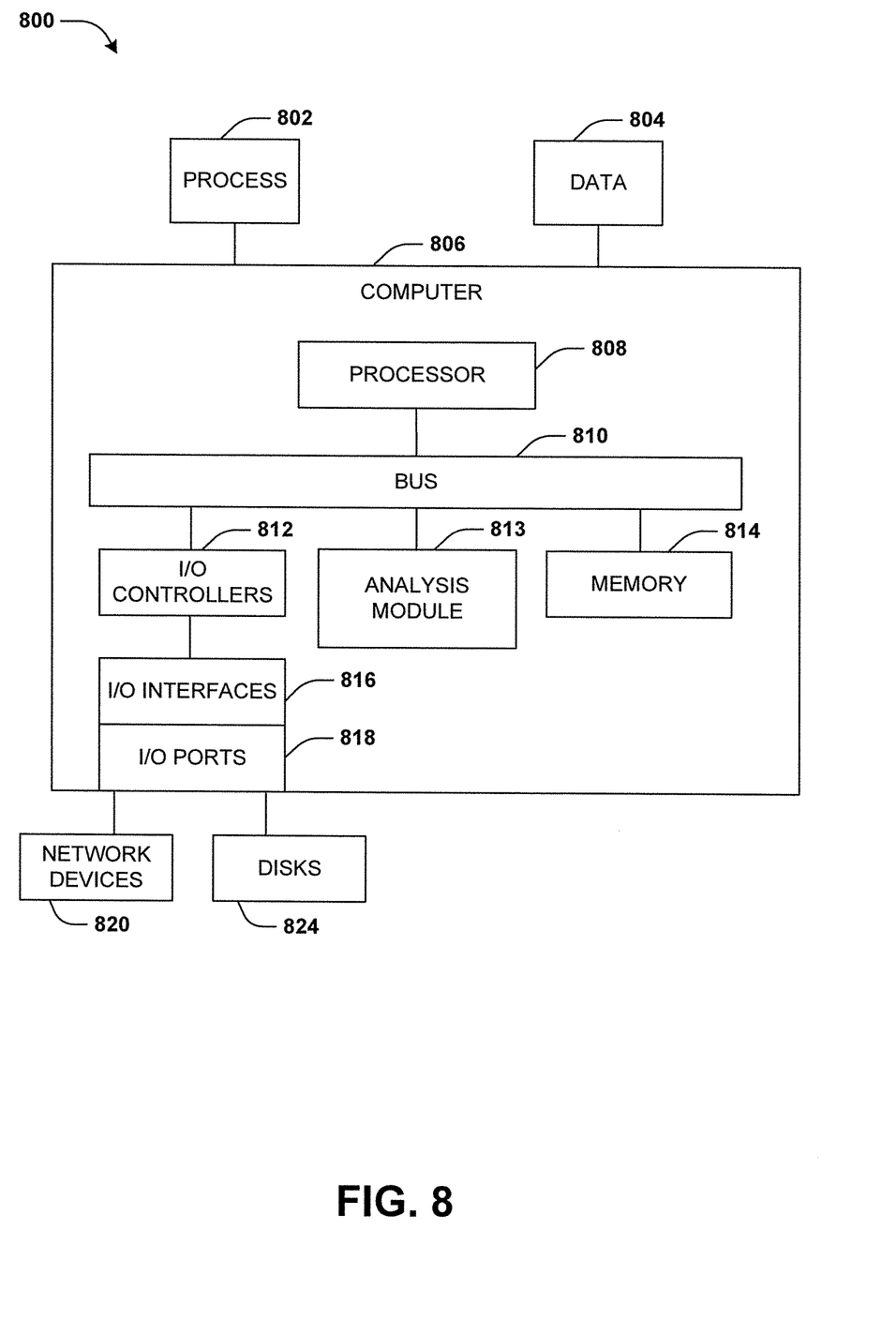
FIG. 8 illustrates an embodiment of a computing system configured with the example systems and/or methods disclosed.

FIG. 8 illustrates an example computing device that is configured and/or programmed with one or more of the example systems and methods described herein, and/or equivalents. The example computing device may be the computer 806 that includes a processor 808, a memory 814, and I/O ports 818 operably connected by a bus 810. In one example, the computer 806 may include logic of the analysis module 813 (e.g., analysis module 110 of FIG. 1 and/or analysis module 302 of FIG. 3) configured to facilitate the system 100, the method 200, the system 300, the method 400, the system 500, and/or the system 600 shown in FIGS. 1-6. In different examples, the logic of the analysis module 813 may be implemented in hardware, a non-transitory computer-readable medium 702 with stored instructions, firmware, and/or combinations thereof. While the logic of the analysis module 813 is illustrated as a hardware component attached to the bus 810, it is to be appreciated that in other embodiments, the logic of the analysis module 813 could be implemented in the processor 808, stored in memory 814, or stored in disk 824.

In one embodiment, logic of the analysis module 813 or the computer 806 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 806 as data 804 that are temporarily stored in memory 814 and then executed by processor 808.

The logic of the analysis module 813 may also provide means (e.g., hardware, non-transitory computer-readable medium 702 that stores executable instructions, firmware) for performing rule based source sequencing for allocation.

Generally describing an example configuration of the computer 806, the processor 808 may be a variety of various processors including dual microprocessor and other multi-processor architectures. The memory 814 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 824 may be operably connected to the computer 806 via, for example, the I/O interface 816 (e.g., card, device) and the I/O ports 818. The disks 824 may be, for example, a magnetic disk drive, a solid state disk drive, a floppy disk drive, a tape drive, a Zip drive, a flash memory card, a memory stick, and so on. Furthermore, the disks 824 may be a CD-ROM drive, a CD-R drive, a CD-RW drive, a DVD ROM, and so on. The memory 814 can store a process 802 and/or a data 804, for example. The disk 824 and/or the memory 814 can store an operating system that controls and allocates resources of the computer 806.

The computer 806 may interact with input/output (I/O) devices via the I/O interfaces 816 and the I/O ports 818. The I/O devices may be, for example, a keyboard, a microphone, a pointing and selection device, cameras, video cards, displays, the disks 824, the network devices 820, and so on. The I/O ports 818 may include, for example, serial ports, parallel ports, and USB ports.

The computer 806 can operate in a network environment and thus may be connected to the network devices 820 via the I/O interfaces 816, and/or the I/O ports 818. Through the network devices 820, the computer 806 may interact with a network. Through the network, the computer 806 may be logically connected to remote computers (e.g., the computer 806 may reside within a distributed computing environment to which clients may connect). Networks with which the computer 806 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
   control execution of a batch process for a batch job by:
      querying a batch definition database to retrieve a record identification plugin comprising a first declarative definition and a database query statement used by the record identification plugin to select records within a database for processing by the batch job;
      querying the batch definition database to retrieve a process records plugin comprising a second declarative definition defining how the process records plugin is to process the records selected by the record identification plugin;
      interpreting the first declarative definition of the record identification plugin to control execution of the batch process to select the records within the database using the database query statement; and
      interpreting the second declarative definition of the process records plugin to control execution of the batch process to process the records selected by the record identification plugin to create a batch job result.

2. The non-transitory computer-readable medium of claim 1, wherein the execution of the batch process is performed through non-compiling declarative definition interpretation that does not compile programming code.

3. The non-transitory computer-readable medium of claim 1, wherein the computer-executable instructions cause the processor to:
   query the batch definition database to identify strategy instructions for the batch job, wherein the strategy instructions are either:
      (i) a thread level select strategy specifying that the record identification plugin is to select, but not load into a memory, the records from the database and return an identifier of the records for processing by one or more threads of the process records plugin; or
      (ii) a job level select strategy specifying that the record identification plugin is to load the records into the memory for assignment of the records from the memory to the one or more threads of the process records plugin; and
   control execution of the batch process based upon the strategy instructions identified by the query.

4. The non-transitory computer-readable medium of claim 1, wherein the computer-executable instructions cause the processor to:

query the batch definition database to identify a job type of the batch job, wherein the job type is either:
(i) an ad-hoc job type used to implement logic, of the process records plugin, upon the records selected by the records identification plugin; or
(ii) an extract job type used to extract data from the records selected by the record identification plugin and store the data within an extract file; and
control execution of the batch process based upon job type.

5. The non-transitory computer-readable medium of claim 4, wherein the computer-executable instructions cause the processor to:
responsive to the job type being the extract job type:
(i) extract the data from the database into a data area using the records identification plugin;
(ii) determine a file path, a file name, and a data format for the extract file based upon the job type; and
(iii) store the data into the extract file according to the data format, wherein the extract file is stored using the file path and the file name.

6. The non-transitory computer-readable medium of claim 1, wherein the computer-executable instructions cause the processor to:
query the batch definition database to identify a batch control record that references batch execution program code that is executed by the batch process; and
interpret the first declarative definition and the second declarative definition into a script that is executed by the batch execution program code.

7. The non-transitory computer-readable medium of claim 1, wherein the computer-executable instructions cause the processor to:
construct the batch job by:
displaying a batch job definition interface populated with:
(i) a first interface with functionality used to receive the first declarative definition for the record identification plugin and the database query statement; and
(ii) a second interface with functionality used to receive the second declarative definition for the process records plugin; and
responsive to receiving the first declarative definition, the database query statement, and the second declarative definition through the batch job definition interface:
(i) constructing the record identification plugin based upon the first declarative definition and the database query statement;
(ii) constructing the process records plugin based upon the second declarative definition;
(iii) storing the record identification plugin and the process records plugin within the batch definition database; and
(iv) constructing the batch job to reference the record identification plugin and the process records plugin.

8. The non-transitory computer-readable medium of claim 1, wherein the computer-executable instructions cause the processor to:
during execution of a thread of the batch process:
(i) responsive to a current work unit being a first work unit for the thread, set a first parameter to a first value indicative of the current work unit being the first work unit; and
(ii) responsive to the current work unit being a last work unit for the thread, set a second parameter to a second value indicative of the current work unit being the last work unit.

9. The non-transitory computer-readable medium of claim 1, wherein the computer-executable instructions cause the processor to:
responsive to receiving a first parameter change request for the record identification plugin, update the batch definition database based upon the first parameter change request; and
responsive to receiving a second parameter change request for the process records plugin, update the batch definition database based upon the second parameter change request.

10. A computing system, comprising:
a processor connect to memory;
an analysis module stored on a non-transitory computer readable medium and configured with instructions that when executed by the processor cause the processor to:
control execution of a batch process for a batch job by:
(i) querying a batch definition database to retrieve a record identification plugin comprising a first declarative definition and a database query statement used by the record identification plugin to select records within a database; and
(ii) interpreting the first declarative definition of the record identification plugin to control execution of the batch process to select the records within the database using the database query statement; and
(iii) executing the batch process to generate and output a batch job result that is controlled by at least the interpreted first declarative definition and the records selected.

11. The computing system of claim 10, wherein the execution of the batch process is performed through non-compiling declarative definition interpretation that does not compile programming code.

12. The computing system of claim 10, wherein the instructions cause the processor to:
query the batch definition database to identify strategy instructions for the batch job, wherein the strategy instructions are either:
(i) a thread level select strategy specifying that the record identification plugin is to select, but not load into a memory, the records from the database and return an identifier of the records for processing by one or more threads of a process records plugin of the batch process; or
(ii) a job level select strategy specifying that the record identification plugin is to load the records into the memory for assignment of the records from the memory to the one or more threads of the process records plugin; and
control execution of the batch process based upon the strategy instructions identified by the query.

13. The computing system of claim 10, wherein the instructions cause the processor to:
query the batch definition database to identify a job type of the batch job, wherein the job type is either:
(i) an ad-hoc job type used to implement logic, of a process records plugin of the batch process, upon the records selected by the records identification plugin; or
(ii) an extract job type used to extract data from the records selected by the record identification plugin and store the data within an extract file; and control execution of the batch process based upon job type.

14. The computing system of claim 13, wherein the instructions cause the processor to:
responsive to the job type being the extract job type:
(i) extract the data from the database into a data area using the records identification plugin;
(ii) determine a file path, a file name, and a data format for the extract file based upon the job type; and
(iii) store the data into the extract file according to the data format, wherein the extract file is stored using the file path and the file name.

15. A computer-implemented method, the computer-implemented method involving a computing device comprising a processor, and the computer-implemented method comprising:
executing, on the processor, instructions that cause the computing device to perform operations that:
construct a batch job by:
displaying a batch job definition interface populated with:
(i) a first interface with functionality used to receive a first declarative definition and a database query statement used by a record identification plugin to select records within a database for processing by the batch job; and
(ii) a second interface with functionality used to receive a second declarative definition defining how a process records plugin is to process the records selected by the record identification plugin; and
responsive to receiving the first declarative definition, the database query statement, and the second declarative definition through the batch job definition interface:
(i) constructing the record identification plugin based upon the first declarative definition and the database query statement;
(ii) constructing the process records plugin based upon the second declarative definition;
(iii) storing the record identification plugin and the process records plugin within a batch definition database; and
(iv) constructing the batch job to reference the record identification plugin and the process records plugin; and
schedule a batch process to execute the batch job.

16. The computer-implemented method of claim 15, wherein the instructions cause the computing device to:
provide, through the batch job definition interface, a template record of batch execution program code that is executable by the batch process;
responsive to receiving a copy command for the template record, duplicate of the template record to create a batch control record, within the batch definition database, that refers to the batch execution program code; and
associate the record identification plugin and the process records plugin with the batch control record.

17. The computer-implemented method of claim 16, wherein the instructions cause the computing device to:
control execution of the batch process for the batch job by:
(i) querying the batch definition database to retrieve the batch control record; and
(ii) utilizing the batch control record to identify the batch execution program code for execution by the batch process.

18. The computer-implemented method of claim 15, wherein the instructions cause the computing device to:
display, through the batch job definition interface, field and value pairs of records that are to be selected by the database query statement.

19. The computer-implemented method of claim 15, wherein the instructions cause the computing device to:
execute the batch process through non-compiling declarative definition interpretation that does not compile programming code.

20. The computer-implemented method of claim 19, wherein the instructions cause the processor to:
responsive to identifying an error with the execution of the batch process, perform erroring handling to address the error; and
restart the batch process after performance of the erroring handling.

* * * * *